Patented May 5, 1936

2,039,729

UNITED STATES PATENT OFFICE 2,039,729

SELF-LAPPING BRAKE VALVE

Ewing K. Lynn, East McKeesport, Pa., assignor to The Westinghouse Air Brake Company, Wilmerding, Pa., a corporation of Pennsylvania Application January 11, 1935, Serial No. 1,327

18 Claims. (Cl. 303—54)

This invention relates to control valve devices for fluid pressure apparatus and more particularly to a brake valve device of the self-lapping type for use in controlling the operation of fluid pressure brake equipment.

In the self-lapping brake valve devices heretofore employed for controlling the operation of fluid pressure brake equipment to effect the application and release of the brakes, the manual power applied to the brake valve handle or lever to control the operation of the brake valve device is opposed by a heavy regulating spring and also by fluid at brake cylinder pressure acting upon one side of a movable abutment such as a piston or a flexible diaphragm, so that it requires considerable manual effort to move the operating handle or lever to a brake applying position and to hold it in this position. This is objectionable as it tends to tire the operator and also makes it difficult for the operator to accurately control the application and release of the brakes.

The principal object of this invention is to provide an improved self-lapping brake valve device which will be free of these objections.

A further object of this invention is to provide an improved self-lapping brake valve device which is very sensitive to variations in fluid pressure.

A further object of the invention is to provide an improved self-lapping brake valve device which can be constructed easily and at low cost.

Another object of the invention is to provide an improved self-lapping brake valve device which is operable to provide any desired brake cylinder pressure quickly and accurately.

Figure 1:
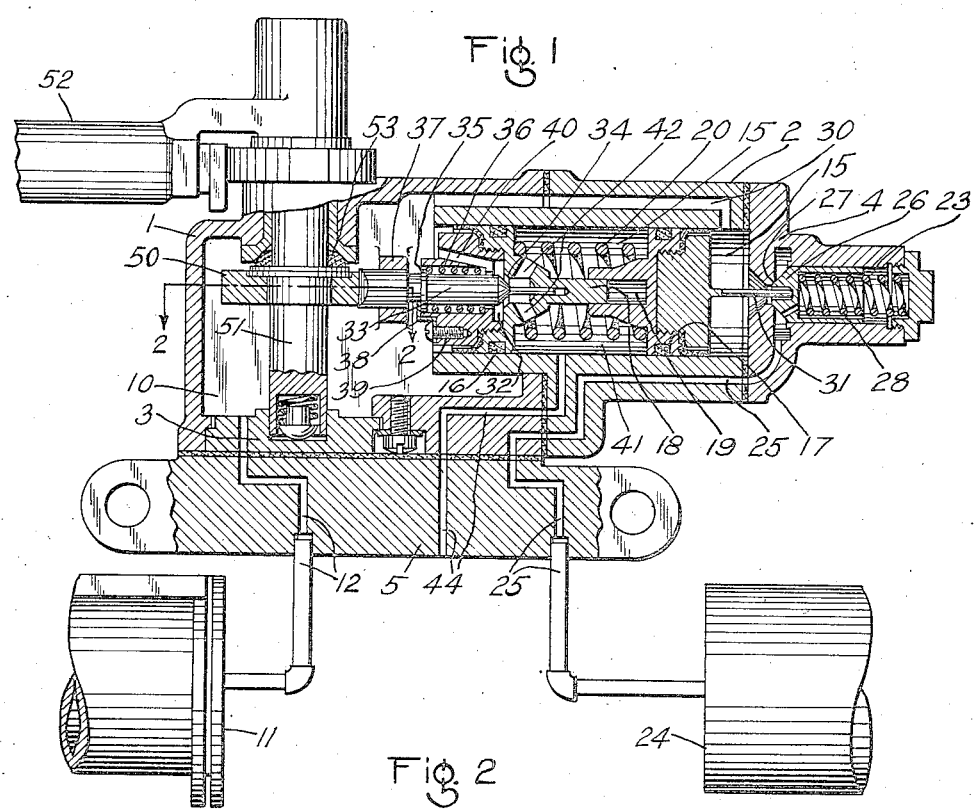
Figure 2:
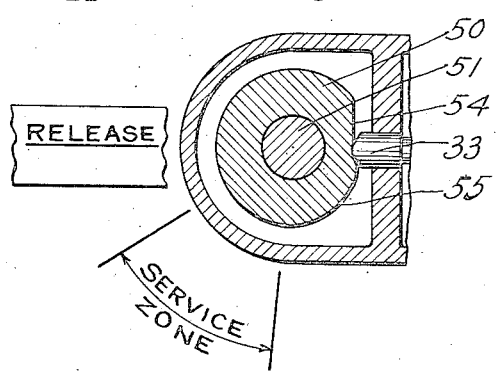

Other objects of the invention and features of novelty will be apparent from the following description taken in connection with the accompanying drawing in which Figure 1 is a sectional view of the improved self-lapping brake valve provided by my invention with portions shown in elevation, and Figure 2 is a fragmentary sectional view taken substantially along the line 2—2 of Figure 1.

Referring to the drawing, the improved self-lapping brake valve provided by my invention comprises a casing constructed of a plurality of sections and including a principal section 1, a side section 2, a bottom section 3, an inlet valve section 4, and a bracket portion 5. The portions of the casing may be secured together in any suitable manner, and when secured together form a pressure chamber 10 which is constantly in communication with the brake cylinder 11 by means of the pipe and passage 12.

The side section 2 has a cylindrical bore 15 therein in which are positioned a pair of movable abutments in the form of pistons 16 and 17, the piston 16 having a reduced end portion 18 which is adapted to extend into a bore 19 in the piston 17. A compression spring 20 is positioned between the pistons 16 and 17 and normally urges these pistons apart.

The inlet valve section 4 has a valve chamber 23 formed therein and which is in constant communication with the main reservoir 24 by means of the pipe and passage 25. The chamber 23 has a supply valve element 26 mounted therein which is adapted to seat against the seat 27 formed in the casing section 4 and is normally urged against its seat by the spring 28 to cut off communication between the chamber 23 and the pressure chamber 10 which communicates with the portion of the cylinder 15 adjacent the inlet section 4 by means of the passage 30.

The supply valve element 26 has a recess formed in the end thereof into which projects a stem 31 which extends from the face of the piston 17.

The movable abutment or piston 16 has a chamber 32 formed therein in which is mounted the release valve element 33 adapted to seat against a seat 34 formed in the piston. The release valve element 33 has a shoulder 35 formed thereon which is engaged by the spring 36 which normally urges the release valve member 33 to the left as viewed in Figure 1, to move this valve element to its open position, while the end of the valve element 33 extends through a bore in the bracket portion 37 formed integral with the casing section 1. The valve element 33 is slidable in this bore and is supported thereby. The abutment 16 has a retaining member 38 secured thereon by means of the screw 39 and adapted to engage the shoulder 35 to limit the movement of the valve member 33 to the left by means of the spring 36.

The chamber 32 communicates with the pressure chamber 10 by means of the passage 40 and it communicates with the chamber 41 intermediate the abutments 16 and 17 by means of the passages 42, while the chamber 41 is in constant communication with the atmosphere by means of the passage 44.

The spring 20, which urges the abutments 16 and 17 apart, the spring 28, which urges the supply valve member 26 to its seat, and the spring 36, which urges the release valve member 33 to its seat, are proportioned in strength so that the spring 28, which is associated with the supply valve 26, is stronger than the spring 36, which is associated with the release valve member 33, but is weaker than the spring 20, which is associated with the movable abutment.

For controlling the operation of the supply and release valves a cam 50 is provided and is mounted on a shaft 51 which extends into the main casing section, and which has the operating handle 52 secured on the outer end thereof. Suitable packing indicated at 53 is provided to seal the joint between the shaft 51 and the casing section 1 to prevent the escape of fluid under pressure from the pressure chamber 10.

The cam 50 has peripheral cam surfaces thereon adapted to engage the end of the release valve member 33, the cam surfaces including a release portion 54 and a service portion 55.

With the brake valve handle 52 in the release position, the cam 50 is also in release position, as shown in Figure 2, and with the cam in this position the outer end of the release valve element 33 is either in contact with the cam surface 54 or in close proximity to this surface. With the cam in this position it does not exert any inward pressure on the valve element 33 so that the pressure of the spring 36 maintains the release valve in the open position. With the release valve unseated the brake cylinder 11 is open to the atmosphere through the pipe and passage 12, the pressure chamber 10, passage 40, the valve chamber 32, passage 42, the chamber 41 and the passage 44.

The supply valve element 26 is maintained in its closed position by the spring 28, which, as stated above, is more powerful than the spring 36.

In order to effect an application of the brakes, the brake valve handle 52 is moved in a counterclockwise direction, as viewed in Figure 2 of the drawing, causing the shaft 51 to be rotated and causing the cam 50 to turn so that the cam surface 55 engages the end of the release valve element 33 and forces it to the right as viewed in Figure 1 so that the release valve element engages the seat 34 formed in the movable abutment 16. On further movement of the release valve element 33 the movable abutment 16 is moved to the right as viewed in Figure 1 and the force applied to this movable abutment is transmitted through the relatively heavy spring 20 to the movable abutment 17 and thence to the supply valve element 26 through the projection 31, causing the supply valve element 26 to be moved away from its seat against the spring 28, which, as stated above, is less powerful than the spring 20. When the supply valve element 26 is moved to the right away from its seat, fluid under pressure from the reservoir 24 is permitted to flow through the pipe and passage 25 to the valve chamber 23 and thence to the portion of the cylinder 15 adjacent the end of the movable abutment 17 and through the passage 30 to the pressure chamber 10. As the pressure chamber 10 is in constant communication with the brake cylinder 11 by means of the pipe and passage 12 the pressures in the pressure chamber and the brake cylinder are always the same.

As the pressure in the pressure chamber 10 builds up, the force exerted on the movable abutments 16 and 17 increases so as to cause these abutments to move towards each other against the spring 20 which urges them apart.

Initial movement of the movable abutments 16 and 17 relative to each other will result in the movement of the movable abutment 17 to the left as viewed in Figure 1, as movement of this abutment in this direction will be assisted by the spring 28 which, as stated above, is more powerful than the spring 36. The movable abutment 16, therefore, will be held by the valve element 33 which engages the seat 34. When the movable abutment 17 moves to the left as viewed in Figure 1 as a result of an increase in the pressure of the fluid in the pressure chamber 10, the supply valve element 26 is permitted to move to the left, being urged by the spring 28 so that it engages the seat 27, thereby cutting off the supply of fluid under pressure from the main reservoir 24 to the pressure chamber 10, and, as the release valve element 33 is already in engagement with its seat, the brake valve device is automatically lapped.

If when the several parts of the brake valve device have been moved to the lap position it is desired to increase the brake cylinder pressure, the brake valve handle 52 is moved in a counterclockwise direction to another position in the service zone. When the handle is thus moved the cam surface 55 of the cam element 50 tends to gradually move toward the end of the valve element 33 and urges this element to the right as viewed in Figure 1. As the valve element 33 is already in engagement with its seat in the piston 16 movement of the valve element is transmitted to the piston 16 and therefrom through the relatively heavy spring 20 to the piston 17 with the result that the pistons 16 and 17 move together, that is, move as a unit, and the projection 31 associated with the piston 17 engages the supply valve element 26 and forces this element to the right away from its seat against spring 28. This allows fluid under pressure to flow from the reservoir 24 to the cylinder 15 and the pressure chamber 10, and therefrom to the brake cylinder 11 until the pressure in the pressure chamber 10 has built up to a value sufficient to urge the piston 17 towards the piston 16 against the spring 20 an amount sufficient to allow the supply valve element 26 to again engage its seat and cut off the flow of fluid from the reservoir.

If when the several parts of the brake valve device have been moved to the lap position as just described, it is desired to reduce brake cylinder pressure, the brake valve handle 52 is moved in a clockwise direction to another position in the service zone. As the handle is thus being moved the cam surface 55 of the cam element 50 tends to gradually recede from the end of the valve element 33, permitting the spring 36 to move the valve element to the left, as viewed in Figure 1, and away from its seat so as to permit the fluid under pressure in the pressure chamber 10 to escape through the passage 40, the chamber 32 and the passage 42 to the chamber 41 from which it escapes to the atmosphere through the passage 44. The piston 16 at this time is held by the pressure of fluid in the pressure chamber 10 which is sufficient to overcome the force exerted on the piston by the spring 20. The pistons 16 and 17 are not moved to the left at this time by the spring 28 as the supply valve member 26 is in engagement with its seat 27 and no force is transmitted to the projecting portion 31 associated with the piston 17. As the pressure of the fluid in the pressure chamber 10 decreases due to the release of the fluid through the release passage 44 the force exerted on the piston 16 and tending to move the piston to the right decreases, with the result that the force exerted by the spring 20 on the piston 16 exceeds the opposing force of the fluid in the chamber 10 acting on the piston 16 and the piston 16 is moved to the left so that the seat 34 engages the end of the valve element 33 to close the passage controlled by this valve element and cut off the release of fluid from the pressure chamber. Thus the brake valve device is automatically lapped after a reduction in the brake cylinder pressure has been effected.

To effect a complete release of the brakes the operating handle 52 is returned to the release position thereby moving the cam 50 to its release position, and, when the cam is moved to this position the action of the spring 36 causes the release valve element 33 to be unseated as before described, permitting fluid under pressure to flow from the pressure chamber 10 and the brake cylinder to the atmosphere. As the pressure of the fluid in the chamber 10 reduces, the piston 16 is caused to move to the left by the spring 20. This spring, however, is of such a length that when it is in its fully extended position it will not move the piston 16 to the left far enough so that the seat 34 engages the end of the release valve element 33 when the cam 50 is in the release position. The release valve element 33, therefore, is permitted to move to its extreme position at the left as viewed in Figure 1, and with the several parts of the brake valve device in the release position as described, the release valve element 33 is maintained out of engagement with the seat 34 by the action of the spring 36.

It will be seen that in the operation of the improved brake valve device provided by this invention the only resistance offered to the movement of the operating handle 52, other than the friction of the moving parts, is that of the spring 28 which must be compressed when the cam 50 is rotated. This force, however, is so small as to be practically negligible.

When the handle 52 is moved to the application position the cam 50 operates to move the supply valve element 26 away from its seat, the distance which the valve element 26 is moved depending upon the amount of movement of the controller handle 52 and the shape of the cam surface 55. When the supply valve element 26 is moved away from its seat fluid under pressure is permitted to flow from the reservoir 24 to the pressure chamber 10 and it will continue to flow until the spring 20, between the abutments 16 and 17, is compressed an amount sufficient to allow the pistons 16 and 17 to move together so as to permit the supply valve element 26 to again engage its seat. The pressure which is required in the pressure chamber 10 to effect relative movement of the pistons 16 and 17 an amount sufficient to allow the supply valve element 26 to engage its seat will depend upon the distance which the supply valve element 26 has been moved away from its seat, which in turn is regulated by the amount of movement of the controller handle 52. It is clear, therefore, that by movement of the controller handle 52 to various points in its range of movement it is possible to control the pressure of the fluid which is established in the pressure chamber 10 and in the brake cylinder 11 which communicates with the pressure chamber.

From the foregoing description it will be understood that I have provided an improved self-lapping brake valve device in which the manual force required to control the operation of the device to effect an application of the brakes is neither opposed by the pressure of the relatively heavy regulating spring, nor by the pressure of the fluid in the pressure chamber nor in the brake cylinder, and that the only opposition to the movement of the operating handle is the negligible frictional resistance of the several elements of the brake valve device, and the relatively small spring employed to move the supply valve member to its seat.

While the preferred embodiment of the improved self-lapping brake valve provided by my invention has been illustrated and described in detail, it should be understood that the invention is not limited to these details of construction but that numerous modifications and changes may be made without departing from the scope of the following claims.

Having now described my invention, what I claim as new and desire to secure by Letters Patent, is:

1. In a device of the class described, a casing having a chamber therein, a first movable abutment and a second movable abutment positioned in said chamber, biasing means normally urging said abutments apart, each of said abutments being subject to fluid pressure in said chamber, which pressure is operable to urge said abutments toward each other, a first valve element associated with said first abutment and controlling a passage for the release of fluid from said chamber, a seat for the valve formed on said first abutment, means normally urging said valve element away from said seat, the movable abutments being movable together by force applied to said valve element and tending to move it to its seat, a second valve element associated with said casing and controlling a passage for the supply of fluid to the said chamber, a seat for the valve formed in said casing, means normally urging said valve element toward said seat, and means associated with said second abutment and operable to move said second valve element from its seat.

2. In a device of the class described, a casing having a chamber therein, a first movable abutment and a second movable abutment positioned in said chamber, biasing means normally urging said abutments apart, each of said abutments being subject to fluid pressure in said chamber, which pressure is operable to urge said abutments toward each other, a first valve element associated with said first abutment and controlling a passage for the release of fluid from said chamber, a seat for the valve formed on said first movable abutment, biasing means normally urging said valve element away from said seat, the movable abutments being movable together by force applied to said valve element and tending to move it to its seat, a second valve element associated with said casing and controlling a passage for the supply of fluid to the said chamber, a seat for the valve formed in said casing, biasing means normally urging said valve element toward said seat, and means associated with said second movable abutment and operable to move said second valve element from its seat, the force exerted by the biasing means associated with said second valve element exceeding the force exerted by the biasing means associated with the said first valve element.

3. In a device of the class described, a casing having a chamber therein, a pair of spaced abutments subject to the pressure of fluid in said chamber, biasing means normally urging said abutments apart, said fluid pressure being operable to urge said abutments toward each other against the force of said biasing means, an inlet valve having an element controlled by one of said movable abutments and being movable by said abutment to the open position, biasing means normally urging said valve element to the closed position, a release valve having a valve element controlled by the other of said abutments, means for biasing an element of the release valve to a position to effect opening of the valve, and manually operable means for moving said release valve element against the biasing means associated therewith.

4. In a device of the class described, a casing having a chamber therein, a pair of spaced abutments subject to the pressure of fluid in said chamber, biasing means normally urging said abutments apart, said fluid pressure being operable to urge said abutments toward each other against the force of the biasing means operable to urge said abutments apart, an inlet valve having an element controlled by one of said movable abutments, and being movable by said abutment to the open position, biasing means normally urging said valve element to the closed position, a release valve having a valve element controlled by the other of said abutments, means for biasing an element of the release valve to a position to effect opening of said valve, and manually operable means for moving the release valve element to the closed position.

5. In a device of the class described, a casing having a chamber therein, a pair of spaced abutments subject to the pressure of fluid in said chamber, biasing means normally urging said abutments apart, said fluid pressure being operable to urge said abutments toward each other against the force of said biasing means, an inlet valve having an element controlled by one of said movable abutments and being movable by said abutment to the open position, biasing means normally urging said valve element to the closed position, a release valve having a valve element controlled by the other of said abutments, means for biasing an element of the release valve to a position to effect opening of said valve, and manually operable means for moving said release valve element against the biasing means associated therewith, the means for biasing the inlet valve to the closed position exerting a force thereon of greater magnitude than the force exerted on the release valve element by the biasing means associated therewith.

6. In a device of the class described, a casing having a chamber therein, a pair of spaced abutments subject to the pressure of fluid in said chamber, biasing means normally urging said abutments apart, said fluid pressure being operable to urge said abutments toward each other against the force of said biasing means, an inlet valve having an element controlled by one of said movable abutments and being movable by said abutment to the open position, biasing means normally urging said valve element to the closed position, a release valve having a valve element controlled by the other of said abutments, means for biasing an element of the release valve to a position to effect opening of said valve, and manually operable means for moving said release valve element against the biasing means associated therewith, the means for biasing the inlet valve to the closed position exerting a force thereon of greater magnitude than the force exerted on the release valve by the biasing means associated therewith, and the biasing means for urging the movable abutments apart exerting a force of greater magnitude than the force exerted by the biasing means associated with either of said valve elements.

7. In a device of the class described, a casing having a chamber therein, a pair of spaced abutments subject to the pressure of fluid in said chamber, biasing means normally urging said abutments apart, said fluid pressure being operable to urge said abutments toward each other against the force of said biasing means, an inlet valve having an element controlled by one of said movable abutments and being movable by said abutment to the open position, biasing means normally urging said valve element to the closed position, a release valve having a valve element controlled by the other of said abutments, means for biasing an element of the release valve to a position to effect opening of said valve, and manually operable means for moving said release valve element against the biasing means associated therewith, the force of the biasing means associated with each of said valve elements being transmitted to said movable abutments, the biasing means associated with one of said valve elements being operable to urge said abutments in one direction, the biasing means associated with the other of said valve elements being operable to urge said movable abutments in the opposite direction.

8. In a device of the class described, a casing having a chamber therein, a pair of spaced abutments subject to the pressure of fluid in said chamber, biasing means normally urging said abutments apart, said fluid pressure being operable to urge said abutments toward each other against the force of said biasing means, an inlet valve having an element controlled by one of said movable abutments and being movable by said abutment to the open position, biasing means normally urging said valve element to the closed position, a release valve having a valve element controlled by the other of said abutments, means for biasing an element of the release valve to a position to effect opening of said valve, and manually operable means for moving one of said valve elements against the biasing means associated therewith, the force of the biasing means associated with each of said valve elements being transmitted to said movable abutments, the force of the biasing means associated with one of said valve elements being operable to urge said abutments in one direction, the biasing means associated with the other of said valve elements being operable to urge said movable abutments in the opposite direction, the biasing means urging the movable abutments apart being operable to oppose movement of said abutments relative to each other by the biasing means associated with said valve elements, the force exerted by the biasing means associated with said abutments and urging them apart exceeding in magnitude the force exerted by the biasing means associated with either of said valve elements, whereby the movable abutments are moved together as a result of force applied thereto by the biasing means associated with the valve elements.

9. In a device of the class described, a casing having a chamber therein, a pair of spaced abutments subject to the pressure of fluid in said chamber, biasing means normally urging said abutments apart, said fluid pressure being operable to urge said abutments toward each other against the force of said biasing means, an inlet valve having an element controlled by one of said movable abutments and being movable by said abutment to the open position, biasing means normally urging said valve element to the closed position, a release valve having a valve element controlled by the other of said abutments, means for biasing an element of the release valve to a position to effect opening of said valve, and manually operable means for moving one of said valve elements against the biasing means associated therewith, the movable abutments being movable relative to each other responsive to variations in the pressure of the fluid in said chamber.

10. In a device of the class described, a casing having a chamber therein, a pair of spaced abutments subject to the pressure of fluid in said chamber, biasing means normally urging said abutments apart, said fluid pressure being operable to urge said abutments toward each other against the force of said biasing means, an inlet valve having an element controlled by one of said movable abutments and being movable by said abutment to the open position, biasing means normally urging said valve element to the closed position, a release valve having a valve element controlled by the other of said abutments, means for biasing an element of the release valve to a position to effect opening of said valve, and manually operable means for moving the inlet valve element to the open position.

11. In a device of the class described, a casing having a chamber therein, a pair of spaced abutments subject to the pressure of fluid in said chamber, biasing means normally urging said abutments apart, said fluid pressure being operable to urge said abutments toward each other against the force of said biasing means, an inlet valve having an element controlled by one of said movable abutments and being movable by said abutment to the open position, biasing means normally urging said valve element to the closed position, a release valve having a valve element controlled by the other of said abutments, means for biasing an element of the release valve to a position to effect opening of said valve, and manually operable means for moving the release valve element to the closed position and to effect movement of the movable abutments whereby the inlet valve element is moved to the open position.

12. In a device of the class described, a casing having a chamber therein, a pair of spaced abutments subject to the pressure of fluid in said chamber, biasing means normally urging said abutments apart, said fluid pressure being operable to urge said abutments toward each other against the force of said biasing means, an inlet valve having an element controlled by one of said movable abutments and being movable by said abutment to the open position, biasing means normally urging said valve element to the closed position, a release valve having a valve element controlled by the other of said abutments, means for biasing an element of the release valve to a position to effect opening of said valve, and manually operable means for moving one of said valve elements against the biasing means associated therewith, the movable abutments being movable relative to each other responsive to an increase in the pressure of the fluid in the chamber, whereby the inlet valve is movable to the closed position by the biasing means associated therewith.

13. In a control valve device, in combination, a casing having a chamber formed therein, a valve operative to supply fluid under pressure to said chamber, a valve operative to release fluid under pressure from said chamber, means including the release valve, a plurality of abutments and a spring interposed between and cooperating with said abutments for actuating the supply valve to supply fluid under pressure to the chamber, one of said abutments being subject to the opposing pressures of fluid in the chamber and said spring for permitting said valve to operate to cut off the supply of fluid to the chamber, the release valve being operative relative to the other abutment to release fluid from the said chamber, said other abutment being subject to the opposing pressures of fluid in the chamber and said spring for engaging said release valve to cut off the flow of fluid from the chamber.

14. In a control valve device in combination, a casing having a chamber formed therein, a valve operative to supply fluid under pressure to said chamber, a valve operative to release fluid under pressure from said chamber, means including the release valve, a plurality of abutments and a spring interposed between and cooperating with said abutments for actuating the supply valve to supply fluid under pressure to the chamber, one of said abutments being subject to the opposing pressures of fluid in the chamber and said spring for permitting said supply valve to operate to cut off the supply of fluid to the chamber, the release valve being operative relative to the other of said abutments to release fluid from the said chamber, the other abutment being subject to the opposing pressures of fluid in the chamber and said spring for engaging said valve to cut off the flow of fluid from the chamber, the supply valve being operable to maintain one of said abutments in position upon a reduction in the pressure of the fluid in said chamber.

15. In a control valve device adapted to be employed to control the pressure of fluid in a brake cylinder, in combination, a casing having a pressure chamber through which fluid under pressure is adapted to be supplied to and released from the brake cylinder, valve means operative to supply fluid under pressure to the pressure chamber, release valve means operative to release fluid from the pressure chamber, spaced abutments subject to the pressure of the fluid in said pressure chamber for controlling the operation of said valve means for controlling the pressure of fluid in the pressure chamber, and means acting in opposition to the pressure of fluid in said pressure chamber for also controlling the operation of said valve means, the release valve means comprising a relatively movable valve element having a seat formed on one of said abutments, biasing means associated with said valve element and urging said valve element away from said seat.

16. In a control valve device adapted to be employed to control the pressure of fluid in a brake cylinder, in combination, a casing having a pressure chamber through which fluid under pressure is adapted to be supplied to and released from the brake cylinder, valve means operative to supply fluid under pressure to the pressure chamber, release valve means operative to release fluid from the pressure chamber, spaced abutments subject to the pressure of the fluid in said pressure chamber for controlling the operation of said valve means for controlling the pressure of fluid in the pressure chamber, and means acting in opposition to the pressure of fluid in said pressure chamber for also controlling the operation of said valve means, the release valve means comprising a relatively movable valve element having a seat formed on one of said abutments, biasing means associated with said valve element and urging said valve element away from said seat, and manually operable means to move said release valve element to its seat and to effect movement of the movable abutments by force transmitted thereto through said release valve element.

17. In a control valve device, a casing having a chamber therein, a pair of movable abutments positioned in said chamber and subject to the pressure of fluid in said chamber, biasing means associated with said abutments and operable to urge said abutments apart, said abutments being movable relative to each other, and being movable together, a release valve controlling the release of fluid from said chamber, a supply valve controlling the supply of fluid to said chamber, biasing means associated with the release valve and urging said release valve to the open position, biasing means associated with the supply valve and urging said supply valve to the closed position, and manually operable means to control said release and supply valves.

18. In a control valve device, a casing having a chamber therein, a pair of movable abutments positioned in said chamber and subject to the pressure of fluid in said chamber, biasing means associated with said abutments and operable to urge said abutments apart, said abutments being movable relative to each other, and being movable together, a release valve controlling the release of fluid from said chamber, a supply valve controlling the supply of fluid to said chamber, biasing means associated with the release valve and urging said release valve to the open position, biasing means associated with the supply valve and urging said supply valve to the closed position, and manually operable means to control said release and supply valves, said manually operable means being operable to effect closing of the release valve and to effect opening of the supply valve.

EWING K. LYNN.